United States Patent Office 3,631,072
Patented Dec. 28, 1971

3,631,072
EPOXIDATION OF DICYCLOPENTADIENE
Ming N. Sheng, Cherry Hill, and Rudolph Rosenthal, Broomall, Pa., assignors to Atlantic Richfield Company, New York, N.Y.
No Drawing. Filed Mar. 9, 1970, Ser. No. 17,941
Int. Cl. C07d 1/08
U.S. Cl. 260—348.5 L      3 Claims

ABSTRACT OF THE DISCLOSURE

Dicyclopentadiene is epoxidized to the diepoxide exclusively when employing tertiary butyl hydroperoxide as the oxidizing agent in the presence of a molybdenum-containing catalyst by removing the tertiary butyl alcohol from the reaction system as it is formed. This permits the use of higher reaction temperatures and the formation of the diepoxide as the exclusive product.

BACKGROUND OF THE INVENTION

Field of the invention

This invention relates to a method for epoxidizing dicyclopentadiene to produce the diepoxide exclusively when employing tertiary butyl hydroperoxide as the oxidizing agent in the presence of a molybdenum-containing catalyst and in particular to such process wherein the tertiary butyl alcohol produced by reduction of the hydroperoxide is removed from the reaction system as it is formed.

Prior art

Recently a process has been developed for epoxidizing olefins using as the oxidizing agent an organic hydroperoxide and a molybdenum compound as the catalyst. This process has been described in U.S. Pat. No. 3,351,635 (1967) and in Belgium Pat. No. 674,076 (1966) as well as in numerous other patents and literature articles. One of the preferred hydroperoxides is tertiary butyl hydroperoxide and a preferred catalyst is any compound of molybdenum. Both of the above mentioned patents describe a vast number of molybdenum compounds of known structure and composition which can be employed as a catalyst and U.S. Pat. No. 3,434,975 (1969) describes a molybdenum containing composition of undetermined structure prepared by reacting molybdenum metal with a peroxy compound in the presence of a $C_1$ to $C_4$ saturated alcohol. This material is also shown to be an excellent epoxidation catalyst in the described process. The prior art has shown that the particular molybdenum compound employed as the catalyst is immaterial although for convenience those which are soluble in the epoxidation reaction medium are preferred.

This method, however, when applied to the epoxidation of diolefins does not produce the diepoxide exclusively, but only the diepoxide admixed with a considerable amount of monoepoxide and the diolefin. Consequently, it was found necessary to first produce the monoepoxide, recover it, then react it with an excess of hydroperoxide to produce diepoxide admixed with unconverted monoepoxide which was separated and recycled.

When both the monoepoxide and diepoxide are solids their separation is costly and difficult. This is true for the epoxides of dicyclopentadiene wherein both the mono- and the diepoxide are solids.

In accordance with the present invention the surprising discovery has been made that dicyclopentadiene can be epoxidized exclusively to the diepoxide with high yield by removing the tertiary butyl alcohol from the reaction mixture as it is formed during the reaction by reduction of the tertiary butyl hydroperoxide.

SUMMARY OF THE INVENTION

Dicyclopentadiene is epoxidized with a small stoichiometric excess of tertiary butyl hydroperoxide in the presence of a molybdenum-containing catalyst employing reaction temperatures above the boiling point of tertiary butyl alcohol and preferably above 100° C. in order to remove the tertiary butyl alcohol from the reaction system substantially as fast as it is formed preferably employing distillation for removing the alcohol.

It is an object of this invention to provide a method for the epoxidation of dicyclopentadiene to produce the diepoxide exclusively in a single epoxidation step.

It is another object of this invention to produce dicyclopentadiene diepoxide in a single step employing tertiary butyl hydroperoxide as the oxidizing agent in the presence of a molybdenum-containing catalyst.

It is another object of this invention to epoxidize dicyclopentadiene using tertiary butyl hydroperoxide as the oxidizing agent in the presence of a molybdenum-containing catalyst and removing the tertiary butyl alcohol from the reaction system as it is formed.

Other objects of this invention will be apparent from the description of the preferred embodiments and from the claims.

DESCRIPTION OF THE PREFERRED EMBODIMENTS

In carrying out the method of this invention it is preferred to use a mole ratio of tertiary butyl hydroperoxide to dicyclopentadiene slightly in excess of 2:1, in general, from 2:1 to 3:1 although 2.05:1 to 2.5:1 is a preferable range.

As has been pointed out any molybdenum compound disclosed in the above-identified prior art patents can be used in the process of this invention including the completely inorganic compounds such as the oxides, chlorides, the coordinate complexes, e.g., molybdenum hexacarbonyl, and the heteropoly complexes, e.g., sodium silico-12-molybdate, the organo-molybdenum compounds such as molybdenyl (VI) acetylacetonate, $MoO_2(C_5H_7O_2)_2$, molybdenum (III) acetylacetonate, $Mo(C_5H_7O_2)_3$, and the oxalo-molybdates and molybdenum compounds of undetermined structure such as that prepared in accordance with the above-mentioned patent wherein molybdenum is reacted with a peroxy compound in the presence of a low molecular weight alcohol. The particular molybdenum compound is not a critical part of this invention since as shown by the prior art any molybdenum compound can be employed as the catalyst when the olefin is epoxidized with an organic hydroperoxide oxidizing agent.

Since the dicyclopentadiene is a solid it is preferable to employ a solvent although since the dicyclopentadiene is liquid at reaction temperature a solvent is not critical. The choice of solvent likewise is not critical except that it should boil sufficiently above the boiling point of tertiary butyl alcohol (82.8° C.) so that the tertiary butyl alcohol can be separated from the reaction solution by distillation. In general a solvent boiling between about 110° C. and 200° C. is preferred and it is also preferred that it not have functional groups. The most preferred solvents are the hydrocarbons boiling between about 110° C. and 200° C., for example, toluene, the xylenes, ethyl benzene, the trimethyl benzenes, the diethyl benzenes, n-octane, n-nonane, n-decane, 4-ethyl-heptane, 2,7-dimethyl-octane and the like.

The method of this invention is carried out rather readily by mixing the dicyclopentadiene, solvents (if one is employed) and catalyst in an appropriate reactor provided with a short distillation column, either packed or merely provided with baffles, a distillation head and reflux condenser. The hydroperoxide is added to the mixture and the mixture is brought to a temperature above the boiling point of tertiary butyl alcohol which distills off the tertiary butyl alcohol as formed. The alcohol is condensed and removed from the system.

Although the process is described for batch reactions it is amenable to continuous operation by employing conventional engineering methods.

The following examples are provided to further illustrates the invention and to demonstrate its advance over the methods of the prior art.

EXAMPLE I

Two runs were carried out epoxidizing dicyclopentadiene using the prior art method. In each run the reagents were tertiary butyl hydroperoxide (0.1 mole) dicyclopentadiene (0.05 mole), molybdenum hexacarbonyl, $Mo(CO)_6$ catalyst (0.02 g.) and 10 g. of benzene as the solvent. The dicyclopentadiene was dissolved in the benzene along with the catalyst and thereafter the hydroperoxide was added slowly to the solution. In the first run the mixture was refluxed (about 85° C.) for 2 hours and in the second run the mixture was refluxed for 3 hours. The results obtained are set forth in the table below.

EXAMPLE II

Another run was carried out epoxidizing dicyclopentadiene using the method of this invention. The same reagents and amounts were employed as in Example I except that 0.11 mole of tertiary butyl hydroperoxide was employed and the benzene was replaced with 30 g. of toluene. In this run the reaction flask was provided with a short conventional distillation column fitted with a distillation head and reflux condenser so that the tertiary butyl alcohol was removed by distillation as formed. The reaction temperature was about 100° C. and the alcohol was removed at an overhead temperature in the range of 82° C. to 85° C. The reaction was carried in the same manner as in Example I except for the removal of the alcohol and the reaction time which was 2½ hours. The results are shown in the table (Run 3) in comparison to those of runs 1 and 2 of Example I.

TABLE

| Run No. | Hydroperoxide conversion, percent | Yield, mole percent on hydroperoxide converted | |
|---|---|---|---|
| | | Monoepoxide | Diepoxide |
| 1 | 77 | 33 | 66 |
| 2 | 86 | 17 | 80 |
| 3 | 100 | 0 | 86 |

These results show that not only is the hydroperoxide completely converted when the method of this invention is employed but that the desired dicyclopentadiene diepoxide is produced exclusively in high yields which completely obviates any separation problems. In addition in run 3 it was found that the dicyclopentadiene was completely converted so that only easily separable by-products remained in the reaction mixture.

It will be obvious that benzene could not have been employed as the solvent since it boils at a temperature below that of the tertiary butyl alcohol so that the alcohol could not be removed as formed. It is also preferable that the reaction not be carried out at the boiling point of the solvent if one is used since this removes the solvent thereby obviating the advantage of using the solvent. Accordingly it is preferred to carry out the reaction at a temperature above the boiling point of the tertiary butyl alcohol but below the particular solvent employed, thus when toluene is employed as the solvent a reaction temperature of 100° C. is preferred. With higher boiling solvents, higher temperatures may be used.

We claim:
1. In the process for epoxidizing dicyclopentadiene employing tertiary butyl hydroperoxide as the oxidizing agent in the presence of a molybdenum compound as the catalyst and wherein the tertiary butyl hydroperoxide is reduced to the tertiary butyl alcohol the improvement comprising distilling said tertiary butyl alcohol from the reaction system as formed thereby producing the dicyclopentadiene diepoxide exclusively.

2. The method according to claim 1 wherein the reaction is carried out in the presence of a hydrocarbon solvent boiling in the range of from 110° C. to 200° C.

3. The method according to claim 1 wherein the reaction is carried out at a temperature in the range above the boiling point of said tertiary butyl alcohol and below the boiling point of said solvent.

No references cited.

NORMA S. MILESTONE, Primary Examiner

PO-1050
(5/69)

UNITED STATES PATENT OFFICE
CERTIFICATE OF CORRECTION

Patent No. 3,631,072      Dated December 28, 1971

Inventor(s) Ming Nan Sheng and Rudolph Rosenthal

It is certified that error appears in the above-identified patent and that said Letters Patent are hereby corrected as shown below:

Column 4, Claim 3, line 43 should read:

"3. The method according to Claim 2 wherein the reac-"

instead of:

"3. The method according to Claim 1 wherein the reac-"

Signed and sealed this 2nd day of May 1972.

(SEAL)
Attest:

EDWARD M. FLETCHER, JR.
Attesting Officer

ROBERT GOTTSCHALK
Commissioner of Patents